Figure 1:
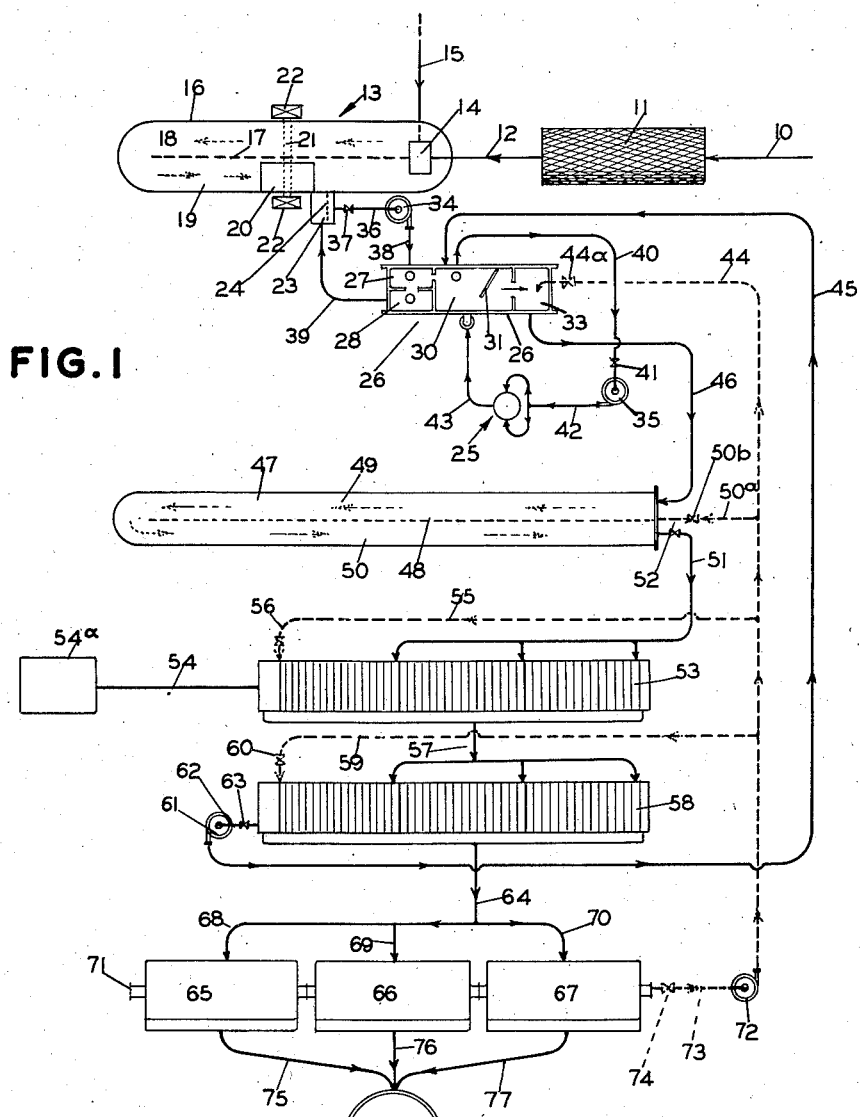

Jan. 3, 1938.  A. W. NICKERSON ET AL  2,142,823
PROCESS AND SYSTEM FOR TREATING WASTEPAPER STOCK
Filed June 22, 1935    3 Sheets-Sheet 1

INVENTORS
ARNO W. NICKERSON
E.C. GILDENZOPF
BY
ATTORNEY.

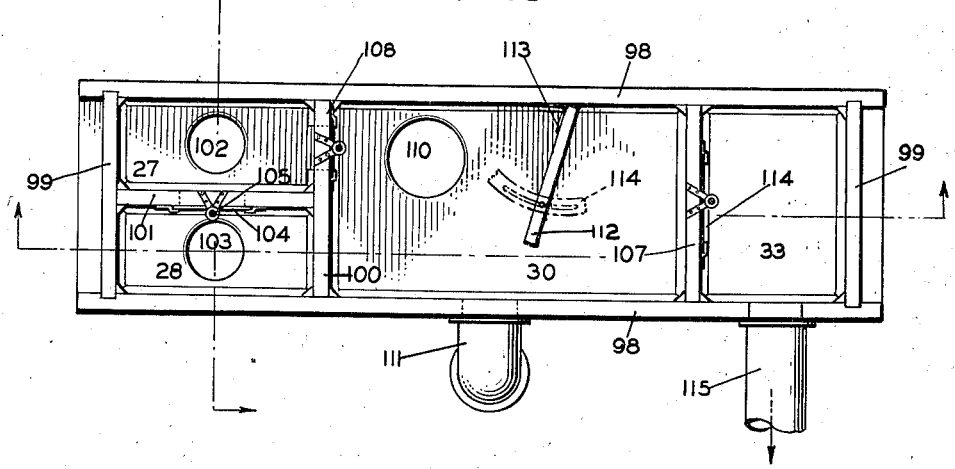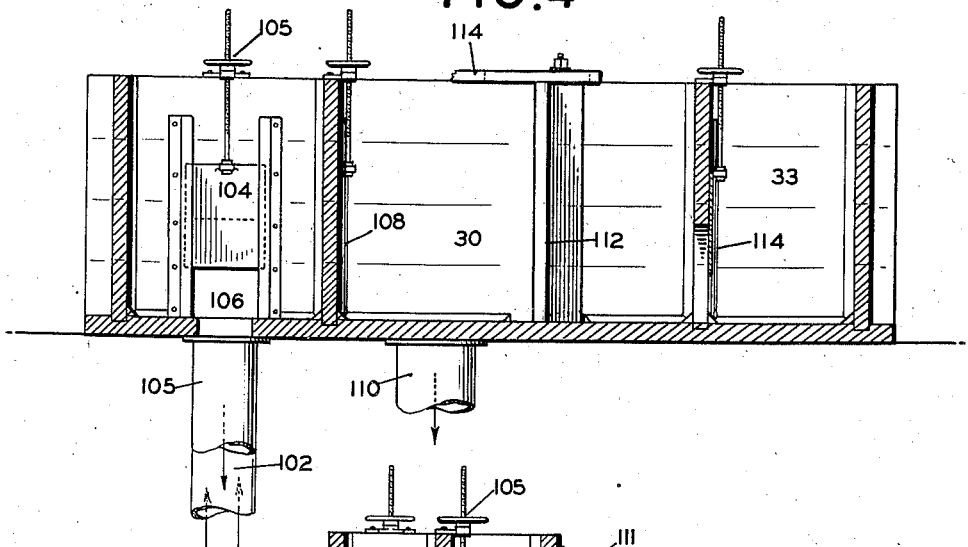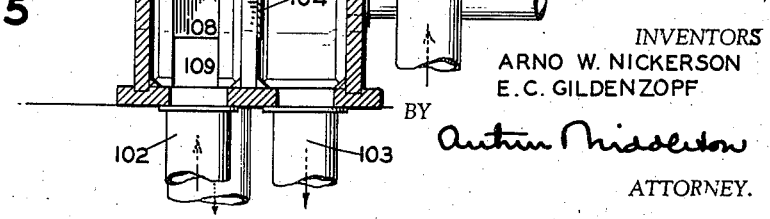

Jan. 3, 1938.  A. W. NICKERSON ET AL  2,142,823
PROCESS AND SYSTEM FOR TREATING WASTEPAPER STOCK
Filed June 22, 1935  3 Sheets-Sheet 3

INVENTORS
ARNO W. NICKERSON
E. C. GILDENZOPF
BY
ATTORNEY.

Patented Jan. 3, 1939

2,142,823

UNITED STATES PATENT OFFICE 2,142,823

PROCESS AND SYSTEM FOR TREATING WASTEPAPER STOCK

Arno W. Nickerson, White Plains, N. Y., and Emil C. Gildenzopf, York, Pa.

Application June 22, 1935, Serial No. 27,880

3 Claims. (Cl. 92—20)

This invention relates to waste paper preparation in which is to be effected the removal of undesirable junk or trash present in the waste paper while the desirable paper constituents are reconditioned by being defiberized and rehydrated, in short, refined for reuse as paper pulp on paper machines.

The practical degree of efficiency and efficacy obtainable in this process of separation, as well as the character and quality of the final paper product recovered, depend largely upon the degree of perfectness with which that separation can be effected, and upon the character and freeness-characteristics of the defiberized refined stock.

According to known method of general procedure the waste stock is subjected to a step of preliminary or rough wet comminution. This brings the disintegration only to such a point that the junk is not reduced to a size where it will pass through subsequent screening steps along with the desirable paper fibres. Consequently the rejects of the screening step contain an appreciable amount of desirable paper fibres which would go to discard, unless such coarse screens are used as would in turn render screening ineffective with regard to junk elimination. The desirable accepted screen-product or paper pulp may be subjected to refining steps such as desirable to render it fit for the paper machines.

The invention therefore aims to improve the quality of separation or selectivity by avoiding breakage or reduction of one constituent, the junk, while bringing the other constituent, the paper, to a relatively high degree of reduction or defiberization. If the two constituents can be obtained in such differing ranges of their respective size, their separation upon the screen is facilitated in principle.

On the other hand, in order to avoid excess paper losses on the screens there has been required a screen perforation consisting of round holes not below a certain size diameter, which in turn would be large enough to permit a certain size of the tough and undesirable junk to pass therethrough along with the usable pre-comminuted paperstock. Although present in a relatively small percentage after the screening, this junky tough constituent has made necessary the use of a sharp cutting type of refiner in order to reduce the junky constituent along with the paper stock. In this case a larger percentage of useful and desirable paper fibres will eventually reach the paper machines through the screens. However since the junky constituents have been comminuted along with the desirable paper stock, it is a natural consequence that a relatively larger percentage of partially comminuted junk will pass along with the desirable paper pulp and enter into the final product.

The quality of the paper stock recovered from the process is furthermore influenced by the character and efficiency of the refining step itself. Therefore in order to obtain properly and evenly refined stock from the refining machines this invention also contemplates improvements in conjunction with the defiberizing steps, which may be adjusted and operated to maintain certain desired volume of stock in transit through the defiberizing steps irrespective of the absolute amount of stock passing through and recovered from the plant. As compared with older installations using an agitator storage tank arrangement, the novel flow control arrangement confines the stock to a small well agitated and homogeneously mixed volume, which results subsequently in more effective defiberizing due to a relatively small quantity in storage at one time.

Customary practice is to furnish the waste paper to a breaker beater direct or through a dry dusting screen to shake loose the fine dirt which comes in mixed waste paper. This breaker beater is usually operated so that stock is continuously discharged through a perforated backfall with the perforations ranging in size from $\frac{11}{16}''$ to $1''$. Such stock is very coarse and its consistency is usually 3 to $3\frac{1}{2}\%$. Attached to these breaker beaters may be what is called a junk remover, which is simply a series of travelling buckets continually scraping the coarse junk which settles in the bottom of a sump elevating the junk to an upper level and by means of showers washes off the paper particles and leaves only the coarse junk which is removed. Rags, strings and other very coarse undefiberizable particles are removed from the breaker beater by means of a rack which is lowered into the tub at intervals after first shutting off the discharge of the breaker beater and reducing the consistency to around $1\frac{1}{2}\%$ to $2\%$. This rag removal may not be carried out oftener than once in 6 or 8 hours.

Following the breaker beater, standard practice is to discharge the accepted stock into a box, the top of which is at the same level as the top of breaker beater tub. From this box stock is pumped direct to a settling trough usually 100 to 150 feet long by 3 or 4 feet wide by about 3 feet deep. Settling is carried on at about 1% consistency or slightly less and at a velocity of flow of 30 feet per minute. This thin stock is then run onto flat screens containing $\frac{3}{8}''$ round holes in the screen plates, sometimes as small as $\frac{1}{4}''$. Stock caught on these screens and thus rejected from passing therethrough is usually thrown away and carries with it about one percentum of good fibres.

The stock then flows to deckers or thickeners where consistency is increased to about $3\frac{1}{2}\%$ to $4\frac{1}{2}\%$ and the water from these deckers is pumped back to the settling trough. Stock then passes to chests where it is pumped to Jordan engines which complete the final refining for the paper machine. Refined stock is then screened through slotted plates usually .018" to .020" before going to the paper machine.

Current methods of refining mixed waste thus rely upon Jordans, equipped with narrow cutting bars, to chop up the bits of waste paper and partially comminuted junk remaining after the breaker beater. The Jordan cuts such pieces of hard sized paper and junk, such as Cellophane, rubberbands, parchment and waxed paper to pieces about as large as the head of a pin and when the Jordan is set up close enough to cut such pieces, it also reduces the length of all fibres, de-grading the strength of the finished board. Such shortened fibres are not only weak but form slowly on the cylinders, and even though a minimum of water is carried on the cylinders, the type of formation on one surface is rough. These short fibres or fines fill the wire of the cylinder, retarding rate of drainage and build up a rough or crows feet surface formation which cannot be smoothed out by the extractor roll or the presses. Once such a sheet is formed it is fixed and cannot be corrected. Competent operators also declare that 20% more steam is required to remove water from around the pinhead size pieces formed into the sheet as would be required to dry the sheet if the formation were uniform. Mixed with these fines is a quantity of chunks or chopped up bits of hard stock which causes spots or lumps. These lumps press through the underliner and show through the white top liner. Examination of multi-ply white patent coated sheets made by the Jordan method of refining reveal that over 50% of the spots in the sheet were due to chopped up and partially defiberized chunks, and due to junk particles having found their way through the various treatment steps into the final products. These spots not only show up as such, but they also bodily form little mounds which interrupt the smoothness of the top liner surface when intended as a printing surface and where consequently perfect smoothness is a desideratum with regard to its effect upon the printing job as well as upon the printing plates.

On a cylinder machine the top liner stocks, which are usually made from raw pulps, are always freer than the middle or filler stocks which are made from waste paper. It has never before been possible to control the freeness of these filler stocks so as to get more rapid formation and better speeds on a cylinder machine. The slowest forming stock on a cylinder machine is always the filler stock and any method which enables the operators to make this filler stock freer will in turn enable the paper machine operators to speed up their machines. In the formation of a cylinder sheet, it is desirable to have the freeness characteristics of the several plies as near alike as possible. If the middle or filler stock is very slow and dense and the top liner stock is relatively free, there is likely to be trouble in formation because these two plies do not felt well together and the machine operator gets what he calls a blow or separation between the plies.

So in this current method of refining it is inevitable that considerable quantities of material, such as Cellophane, small rags and strings, wax paper, parchment paper and other stocks which are very difficult to defiberize, will pass to the Jordan engines. In order to refine this stock sufficiently so as to be able to form it on the paper machine, it is necessary to have the Jordan bars quite narrow and to set the Jordans up hard or close so as to cut up these coarse particles as much as possible. In this process it is also inevitable that the entire mass of the fiberage will be cut and the result is a very slow stock since a large quantity of very fine fibres are present, due to this cutting action. These coarse bits of undefiberized material hardly ever run more than 5% of the total mass. Thus, it will be seen that the expenditure of sufficient energy to cut these hard particles represents a great waste since 95% of the stock is well enough prepared for the paper machine without further treatment if the 5% of undesirable stock can be removed, with part thereof to be rejected and part to be recirculated for retreatment.

Accordingly, the object of this invention is to overcome these difficulties, and to that end important features of this invention comprise the treatment of the paper stock by non-cutting refining methods, associated with the use of selective screening whereby unexpected and unobvious results are obtained. More particularly, it is herein proposed to expose the mixed waste, after passing through a breaker beater, to defiberizing under conditions conducive thereto, while avoiding as far as possible any cutting, shortening or disintegrating not only of the fibres themselves, but especially of any trash or undesirable foreign material which may be present in the mixed waste. In other words, it is desired to leave the trash unacted upon while the stock mass is being defiberized and rehydrated. After defiberization, the mixed waste is then passed to a selective classification or screening zone. Here the useful fibres which have been refined or defiberized readily pass through the screens whereas the trash particles being larger and uncut, are caught by the screens as rejects and removed for discard.

The screening zone may be a two stage one, and preferably is, in which case the coarse rejects from the first screening stage being largely trash or junk, are discarded. The rejects from the second screening stage are largely lumps of hard stock that have escaped defiberization. The fibres of these second stage rejects, being substantially free from trash, can be recovered advantageously by being screened; the accepted stock passing to thickeners and coarser stock passing back to breaker beater, or breaker beater discharge, or to the first defiberizing unit. The double-screened stock can be passed once more through a non-cutting refining zone, whereupon it is ready for the machine chest, since this second non-cutting refining stage prepares all of the accepted fibres for the board machine.

Another feature lies in the arrangement of a novel feed and flow control arrangement in the form of a partitioned or baffled flow box in conjunction with the defiberizing step.

Embodiments of the invention may assume modified forms or arrangements to suit local conditions and environments, but the essence of the invention is the retention of the junk or trash of the mixed waste in its normal condition by using means which will defiberize the fibrage without substantial cutting of the trash. With this refining of the stock there is associated classification treatment for rejecting the trash to discard and separately rejecting lumps or chunks of undefiberized fibrage to retreatment. Accepted stock may be exposed to a final non-cutting refining step.

This invention also contemplates under certain conditions to do away with the customary cutting effect of the Jordan engines ordinarily used and the possible elimination of the final refining step subsequent to the thickeners, inasmuch as the fibrous product obtained from the screening operation according to the novel method of operation will already have attained a degree of refinement which will render it fit for direct use in the paper or board machines.

The refiner to be used for the purposes of this invention is of the type that selectively disintegrates the beaten water mixed stock by way of attritional or shredding as distinguished from cutting effects, that is to say, into a substantially defiberized portion including defiberizable and defiberized and rehydrated fibers of suitable characteristics desirable for paper machine work and quality of final product, and a substantially non-defiberizable and substantially non-comminuted portion, such as trash and junky constituents, which latter are to be discarded.

More specifically it can be said that the refining step here to be employed may be characterized as one in which the beaten stock mass is exposed to a refining step wherein there is effected a mechanical although non-cutting disintegration of the stock substantially by way of attritional and shredding effects through suitably enforced contacts of the stock with suitable shred-producing surfaces of attrition, as in a hydraulic jet impact refiner as distinguished from a mechanically cutting refiner.

In this embodiment it is characteristic for the two stage screen arrangement used in connection with the present non-cutting refining step, that screen holes as small as 1/8" are used in the secondary screening step as compared with the above mentioned 1/4" holes of screens previously used. So, consequently the accepted stock from this last screening operation goes to a decker and is ready for the paper machine screens of the usual slotted type with no further preparation necessary, since the rejects from this 1/8" round hole flat screen are taken off at about 4% consistency and are returned directly to the defiberizing unit immediately following the breaker beater.

A successful series of steps according to this embodiment then comprises: a primary or coarse comminuting step, a non-cutting refining step, a primary settling and washing step, a primary or coarse screening step to receive the thin overflow from the settling step, a secondary or fine screening step from which the rejects are returned to the non-cutting refining step while the screened dilute pulp after thickening goes to a second non-cutting refiner, then to production.

In a preferred practical embodiment there is interposed between the breaker beater or source of stock supply, and the non-cutting refining step, a novel feed and flow control arrangement, which comprises a flow box subdivided into suitable compartments interconnected through adjustable gates, certain compartments being so connected in closed circuit with the source of stock supply on the one hand, and with the refiner on the other hand, that a desired stock volume is maintained in transit through the flow box while new stock is mixed with stock returning from the refiner.

Among the advantages resulting from this mode of stock treatment are: the preservation of the fibre length of the stock as received; the production of a freer stock which gives a faster rate of formation of the fibres on the cylinder molds of the cylinder machine and a faster rate of drainage on Fourdrinier machines; formation is more uniform because of the absence of undefiberized particles which escape usual Jordan treatment since such undefiberized particles in the sheet hold a wet ring therearound and resist drying to a considerable degree; greater strength of filler stock is obtained; better bulk is obtained because the proportion of fine fibres is less than in the usual manner of treatment; and there is a substantial power-saving in stock preparation by this invention, because the tough junk has been removed. Total cost of paper made from stock so treated is thereby lowered.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to us, but such embodiment is to be regarded as typical only of many possible embodiments, and the invention is not to be limited thereto.

Figure 2:
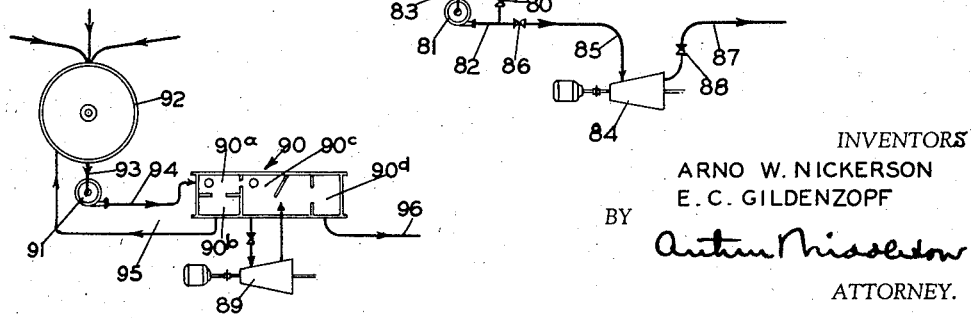
Figure 6:
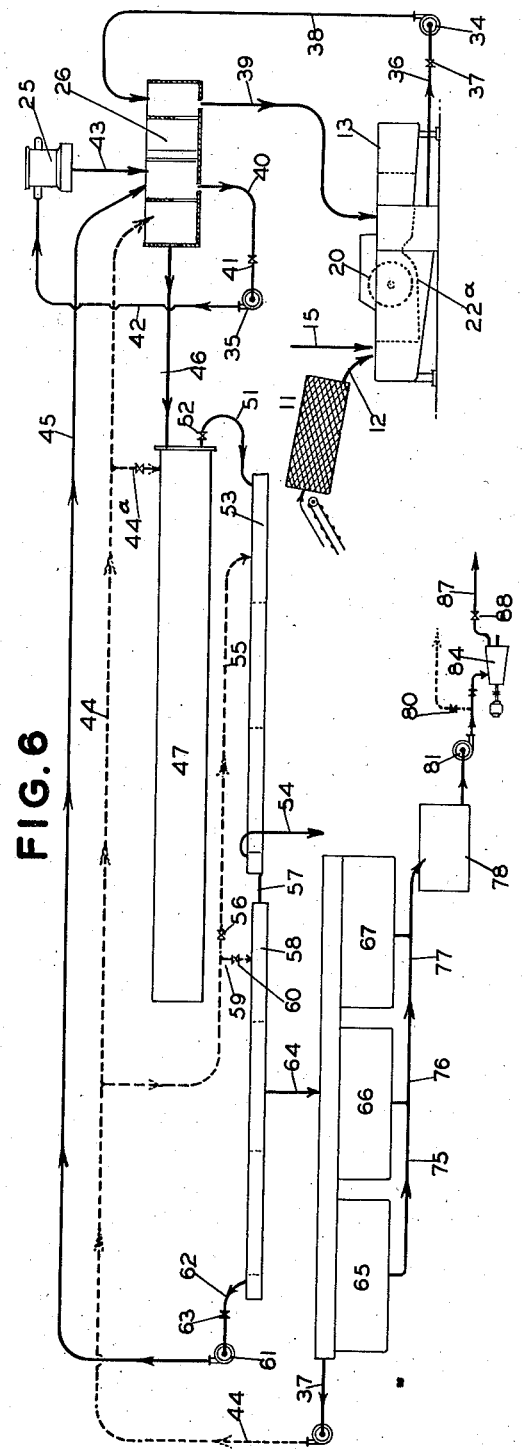

The novel features considered characteristic of our invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 shows a flowsheet including improvements in the method of waste paper stock preparation. Fig. 2 shows an alternate arrangement for carrying out the final refining step therein. Figs. 3, 4 and 5 are detail views of the novel flow box arrangement. Fig. 6 is a diagrammatic showing of a proposed elevational arrangement of the various treatment stages of Fig. 1.

Raw mixed waste paper stock, shown in Fig. 1 to enter the treatment plant at 10, contains a percentage of dry dusty material which prior to the wet treatment is customarily removed as by a dry rotary screen 11. The bulk of the dry mixed stock leaving the rotary screen as at 12 contains aside from the bulk of the waste paper constituent proper an amount of the so-called junk such as rags, strings, rubber bands, wood, Cellophane and other more or less coarse, hard, or tough, and essentially undefiberizable material. The wet treatment of the dry mixed stock begins in a breaker beater 13 of standard construction into which the stock is delivered at 14 together with a water supply indicated at 15. Essentially the breaker beater 13 comprises a longitudinal tank or tub 16 in which a longitudinal partition or baffle 17 forms longitudinal sections 18 and 19. The wet mixture flows through the section 18 from end to end of the tank to allow for the elimination of the coarsest portion of the junk, which is withdrawn by known means, such as a junk remover (not shown). Around the end of the baffle 17, the raw mixture flows to the beater proper which usually has a heavy breaker roll 20 mounted as by a shaft 21 and journals 22.

The beater unit is normally provided with a perforated back fall 22a (see Fig. 6) having perforations ranging in size from 1½" to 1", through which the beaten or pre-comminuted or broken bulb is allowed to pass, in order to be discharged from the unit through a discharge box 23 having an overflow weir 24.

Now follows a refining step executed by a refiner of the non-cutting or non-shearing type. This type of machine is represented by a refiner 25 of the target type, so-called because its defiberizing effect is produced by forcing a high pressure jet of the pulp against a target and relying upon the hydraulic force of the jet for defiberizing. Such a non-cutting or defiberizing machine is to be distinguished from the sharp cutting type, and the importance of its use at this point of the process lies in the fact that there is caused in this machine a defiberization without shortening of the usable fibrous paper constituent of the mixed stock while the junky or tough constituent is largely unsusceptible to this treatment and passes through this treatment stage substantially unchanged.

Interposed between the pre-refining stage (the breaker beater 13) and the defiberizing or pulp refining stage (the non-cutting refiner 25) is a feed and flow control arrangement which comprises essentially a flow box 26 diagrammatically shown in plan view and more specifically described in Figures 3, 4 and 5. As shown in the diagram there are to be distinguished in this flow box 26 certain interconnected compartments, chambers, or sections as formed by an arrangement of partitions, gates, and baffles. There is provided a feed inlet chamber or feed well 27, a surplus return flow chamber 28, both chambers 27 and 28 having potential or actual communication as through a gate. Next to the chambers 27 and 28 is a mixing chamber 30 having a gate connection with the chamber 27. A vertical baffle wall 31 pivotally adjustable about a vertical axis is provided in the mixing chamber 30 for purposes hereinafter to be described. Connected through a gate with the mixing chamber 30 is another compartment which may be called the outlet or diluting chamber 33.

There is provided a low pressure pump 34 to furnish pulp from the breaker beater 13 to the flow box 26, and a high pressure pump 35 to force pulp from the flow box against the target of the target type refiner 25, preferred to be used. Otherwise the flow box 26 is interconnected with the breaker beater 13 and the refiner 25 respectively by way of pump suction connection 36 having a control valve 37, a feed inlet connection 38 leading from pump 34 to the chamber 27, a drain- or surplus discharge connection 39 leading from the chamber 28 back to the discharge box 23, a feed connection 40 leading from the mixing chamber 30 to the inlet of high pressure pump 35 through a control valve 41, a high pressure connection 42 leading from the pump 35 to the target type refiner 25, and a connection 43 for the gravitational return of the refined pulp from the refiner back to the mixing chamber 30.

The flow box 26 can be said to constitute an interconnecting element for coupling with each other in characteristic fashion the two pumping cycles, that is to say the one cycle which includes the pump 34 and the connections 36 and 37 and which may be called the surplus return cycle, with the other pumping cycle which includes the pump 35 and the connections 39 and 40 and which may be called the refining cycle.

The part of the flowsheet including the coupling of the two cycles, to wit the surplus return cycle and the refining cycle, by way of the flow box 26, is emphasized as to its importance by the enlarged detail showing thereof in Fig. 6, using the identical numerals as the corresponding items in Fig. 1. A connection 44 shown in dotted lines brings the so-called white water from subsequent dewatering steps through a control valve 44a to the diluting chamber 33 of the feed box 26 where it mixes with the pulp that is about to leave the flow box. A connection 45 brings screen rejects not fully defiberized to the mixing chamber 30 of the feed box 26 from a subsequent step yet to be described.

An outlet connection 46 leads from the diluting chamber 33 to the subsequent junk separating and pulp treating stages of this mixed stock preparation. Consequently the connection 46 leads into a settling trough 47 which may be of standard design. The settling trough has centrally arranged a vertical baffle wall 48 thus forming two longitudinal sections 49 and 50 through which the pulp may flow in series. A branch 50a from the white water line 44 leads into the settling trough by way of a control valve 50b. From the settling trough 47 a connection 51 having a control valve 52 leads to a coarse screen 53 having round holes of preferably about $\tfrac{3}{16}$" diameter, and which rejects the junky constituent as indicated at 54 into a reject disposal box 54a. The rejects receive a white water spray from a branch 55 of the white water supply line 44 (dotted) through a control valve 56. The screened pulp constitutes the bulk of the usable paper stock and it passes through a connection 57 into a second screening stage found in a fine screen 58 having round holes of about ⅛" diameter. This fine screen rejects those waste paper particles from the usable waste paper stock, which have escaped complete defiberization.

The rejects receive a white water spray or wash from a branch 59 of the white water supply line 44 (dotted) through a control valve 60, so that a pump 61 may return them through a connection 62 and control valve 63, and through the above mentioned connection 45 into the mixing chamber 30 of the feed box 26 so that they will receive another opportunity of being circulated through the refiner 25 for complete defiberization. The screened and accepted pulp leaves the fine screen 58 through a connection 64 to proceed to the customary thickening stage which is here shown to comprise three thickeners or so-called deckers 65, 66, 67 fed by three corresponding branches 68, 69 and 70 of the connection 64. The overflow or so-called white water from these deckers may discharge as at 71. In the present flowsheet the white water is shown to be re-used for spraying the screen rejects as through the branches 55 and 59 and it is also used to dilute pulp from the refining or defiberizing stage by introducing it into the diluting chamber 33 of the flow box 26 as through the aforementioned white water connection 44 (dotted). The white water for that purpose is handled by a pump 72 and through a pump connection 73 having a control valve 74.

The thickened pulp from the deckers 65, 66, 67 is collected through connections 75, 76, 77 in a storage chest 78. The pulp thus treated and collected is of a quality which may for certain purposes be used directly on the paper or board machine after passing through the customary slotted screens which as a rule are found in association with paper machines. This is indicated by a connection 79 having a control valve 80, and a pump 81 having connections 82 and 83. However, it may be desired to send the stock through an additional refiner of the non-cutting type indicated at 84 provided with a connection 85 having a control valve 86, and a connection 87 with a control valve 88. Whereas, heretofore at this final stage the use of a sharp cutting refiner was considered necessary in order to reduce a small remnant proportion of junk in the pulp, it is characteristic of the present invention that a refiner of the non-cutting type may be used with advantage, and sharp cutting effects thus discouraged, inasmuch as any appreciable amount of junky particles have been removed in the earlier stages of this treatment. Or else, still more spectacularly, under certain conditions the last refining stage may be dispensed with entirely.

Fig. 2 shows an optional arrangement in the way of operating the second non-cutting refiner, in that a refiner 89 is associated with a flow box 90 which is similar to the flow box 26 of Fig. 1, and consequently has a feed inlet chamber 90a, a surplus return chamber 90b, a mixing chamber 90c, and a diluting chamber 50d. Accordingly there is also provided a pump 91 which draws pulp from a storage chest indicated at 92 through a connection 93, and through a connection 94 feeds it to the flow box 90. The refiner 89 is closed circuited with the flow box 90 in the manner described above in connection with the flow box 26, while again a surplus discharge connection 95 leads from the flow box back into the storage chest 92. A connection 96 indicates discharge from the flow box 90 to production.

The flow box 26 constitutes an arrangement for coordinating the operation of the breaker beater 13 or else the low pressure pump 34, with the operation of the refiner 25 or else the high pressure pump 34 involving also the redilution with white water from the deckers (connection 44), as well as the rejects return (connection 45) from the fine or secondary screen 58. The flow box 26 thus forms an important coupling element between various stages or phases of the treatment.

An enlarged detail plan view of the flow box 26 shown in Fig. 4 discloses an open rectangular tank 97 having side walls 98 and end walls 99, in which partitions 100 and 101 together with the endwall 99 form the above mentioned feed inlet chamber 27 and the surplus return flow chamber 28 between the side walls 98. An inlet pipe is indicated in the bottom of chamber 27 by the numeral 102. The numeral 103 indicates an outlet pipe leading from the bottom of chamber 28.

A grate 104 vertically operable by handwheel and spindle arrangement 105 controls an opening 106 in the partition 101 and may be actuated to control the amount of surplus return flow from the flow box 26 to the beater discharge box 23. Next to the chambers 27 and 28 there is formed the mixing chamber 30 defined by the partition 100 and another transverse partition 107. A gate 108 similar to the gate 104 controls an opening 109 connecting the feed inlet chamber 27 with the mixing chamber 30. An outlet in the bottom of the mixing chamber 30 is indicated by the outlet pipe 110 which also constitutes the suction pipe for the high pressure pump 35. An elbow 111 leads into the side of the mixing chamber 30 and indicates the connection through which refined pulp is recirculated from the refiner stage 25 back to the mixing chamber 30. There is moreover provided in the mixing chamber a vertical baffle wall 112 hinged at 113 to the side wall of the flow box and adjustable as by slotted sector 114 (shown in dot and dash) in various angular positions. The object is to so adjust the baffle wall 112 with regard to the incoming stream of refined pulp entering through the elbow 111, that a substantially spiral swirl forms in that part of the mixing chamber which lies between the partition 100 and the baffle wall 112 while a certain proportion may be split off for discharge from the flow box. In this way the recirculated refined pulp is thoroughly mixed within the relatively small volume of the mixing chamber before entering the outlet or diluting chamber 33 which is defined by the transverse partition 108 and the tank endwall 99 between the sidewalls 98. A gate 114 similar to the ones already described leads from the mixing chamber 30 into the diluting chamber 33 in which latter white water is added to the pulp before the same leaves the flow box for further treatment. An outlet pipe 115 is shown to lead from the side of the diluting chamber 33. During operation of the flow box the three gates 104, 108 and 114 may be adjusted relative to each other in such a manner that the flows of a desired volume to, through, and from the flow box are established, that is to say the respective gate openings are such that the respective flows and water levels in the various compartments are properly balanced.

This flow box arrangement then has a multiple function and in conjunction with the pumping cycle of pump 34, and the pumping cycle of pump 35, its importance lies in the fact that there is maintained a desired volume in circulation which is commensurate with the pumping efficiency and with the efficiency of the refiner 25 respectively. The refiner is of ample capacity so that a repeated circulation of the pulp therethrough is substantially insured. The efficiency of these machines is thus maintained irrespective of the absolute quantity of pulp passing through the plant for treatment. Moreover, in the mixing chamber 30 the stock is confined to a small well agitated and homogeneously mixed volume into which mingle the rejects introduced from the secondary screen 58 through connection 45. And finally the flow box in chamber 33 thereof takes care of the proper dilution of the refined pulp with white water from connection 44 before passing it on to the separating stages.

In order to distinguish more clearly the actual function of each treatment stage, and more specifically in order to distinguish the pressure connections from the gravitational connections which together with the treatment stages make up the diagram of Fig. 1, there is shown in Fig. 6 a diagrammatic view of a side elevation showing the relative elevation of the various devices involved in the treatment process, thereby exhibiting which are the pump operated lines, and which function by gravitational flow. The devices and connections in Fig. 6, despite a slight difference in the way of showing, have received the same numerals as the corresponding items of Fig. 1 for convenient identification.

The operation is as follows: Dry waste paper stock passes through the rotary screen 11 to be ridded of the fine dust adhering thereto, whereupon it discharges through connection 12 and the feed box 14 into the tank or tub 16 of the breaker beater 13 where it is pulped up with water entering through the water connection 15.

It should be noted that whereas the operation of the plant is conceived to be substantially even and continuous in character, there is a certain phase of batch operation involved in that the mixed waste paper stock is usually dumped intermittently in large single quantities into the tank of the breaker beater. The mixture passes along through the compartment 17 in the tank where the coarsest grade of junk or trash, such as rags, etc., are removed, and on around the end of the baffle 17 into the compartment 19 where it is subjected to crushing or pre-comminuting action by the heavy beater roll 20, the thus pre-comminuted mixed stock, paper, and junk, reaching the discharge box 23 after passing through the familiar perforated backfall 22a which forms a standard part of the breaker beater. The pulp level in the beater tank is substantially defined by the overflow weir 24 in the discharge box 23. The low pressure pump 34 having a certain capacity at which it operates at maximum efficiency, draws overflowing precomminuted pulp from the breaker beater and feeds it under pressure through connection 38 into the feed chamber 27 of the open flow box 26 where it splits into a portion of desired volume which continues on through the flow box 26 to reach the refiner stage 25, whereas the balance enters the surplus discharge chamber 28 through the gate controlled opening 106 and gravitates through the connection 39 into the discharge box 23 of the breaker beater 13. In this way the pump 34 operates under a steady load and its operation is made independent of the momentary actual feed requirement, while the comminuted mixed stock is kept in transit and well mixed. The respective volume of flow from the feed chamber 27 into the mixing chamber 30 and into the surplus discharge chamber 28 are balanced against each other by the relative adjustment of the gates 104 and 108 more clearly shown in Figures 3, 4 and 5.

Pre-comminuted mixed stock enters by way of pipe 102 through the bottom of chamber 27 at approximately 3½% consistency, surging up to a certain level at which the liquid pressure column finds its equilibrium under given conditions of pulp supply and control gate-adjustment. Accordingly, the surplus pulp entering through gate 104 into the surplus discharge chamber 28 finds its way back through the pipe 103 leading from the bottom thereof. The balance of the fresh mixed stock after entering through the gate 108 into the mixing chamber 30 mingles in a swirl with the refined pulp coming from the refiner 25 through elbow 111. A portion of this mixture is the one which feeds the pump 35 of the refining cycle through connection 40 indicated by the pipe 110. The adjustable baffle wall 112 affords a means of controlling to a certain extent the hydraulic swirl by the incoming stream in the mixing chamber as well as the proportioning of the split-off portion which is to continue on to further treatment.

At this point it may be noted that there exists a functional correlation between the adjustable baffle wall or feed splitter 31 (see Fig. 1) and the arrangement of the rejects return from the secondary or fine screen 58, which will be clear from the following consideration: the refined pulp entering the mixing chamber 30 through the connection 43 normally contains particles of not fully defiberized stock, and some of this not fully finished stock will be split off by the baffle 31 and caused to leave the flow box through the connection 46 without having received another chance at recirculation through the refining cycle. These unfinished particles however will be intercepted as rejects from the secondary or fine screen 58 from where they are returned through the pump 61 and the rejects return connection 45 into the mixing chamber 30 for remixing with the stock to be refined.

The non-cutting refiner 25 operated by way of the refining cycle previously defined is particularly useful in that it is of a capacity which will allow the bulk of all the defiberizable material to be repeatedly treated for defiberization with the effect that the fibrous proportion of the mixture, which more or less readily submits to disintegration or pulling apart of the fibres, is gradually and gently but most certainly defizerized particularly by the hydraulic impact action of the target type refiner 25, whereas the tough junky proportion remains substantially unscathed. In this way, these two heterogeneous main constituents of the mixed stock are eventually obtained from the refining step at respective sizes of a widely different order, which predisposes them for efficient separation. A portion of the refined stock from the mixing chamber passes continuously on through gate 114 into the diluting chamber where it is mixed with the white water from the deckers 65, 66, and 67 through the connection 44. This dilution results in a pulp consistency of about 2%.

It should be understood from the foregoing description of the flow box 26 and its accessories, that the flow box as a whole functions substantially as a gravity tank, the water level in the respective compartments being upheld by pump pressure wherever it does not drain away.

Various operating requirements as to change in the volume of flow which passes through the respective operating cycles or is sent to production, can be readily met by the manipulation of the respective gates, or else by valves which may be provided wherever necessary in the respective pipe lines.

Refined pulp diluted with white water to 2% consistency leaves the flow box 26 that is to say the diluting chamber 33 through the outlet pipe 115 or else the connection 46 leading from the side of the diluting chamber 33.

Through the connection 46 the refined pulp containing the two extremes, relatively coarse particles of junk along with relatively finely defiberized paper stock, is fed into the settling trough 47 where the sands and similar particles have a chance to settle out as the pulp flows through the first compartment 49 and on around the end of the baffle 48 through the second compartment 50. To facilitate the sand elimination, etc., at this point white water from branch 50a is added, reducing the consistency of the pulp in the settling trough 47 to 1%. Still the mixed stock contains the junky portion along with the defiberized stock, but it is now ready to be carried through the connection 51 onto the coarse or primary screen 53 which in a practical embodiment of this invention is a round hole screen of $\tfrac{3}{16}''$ hole diameter. With a pulp of the particular characteristics as attained in the foregoing steps the screen is fine enough to make a far-reaching clear separation between the junk and the paper stock, in that practically all the junk is rejected and the rejects discharged through connection 54 into the disposal box 54a, while practically pure paperstock with relatively little loss passes through the screen. That is to say a critical screen caliber is preferably so selected that substantially all the coarse junk is retained, while substantially all the defiberized paper-stock along with particles not fully defiberized are allowed to pass. That is to say that in this critical screening step relatively clean paperstock is at once attained. The not-fully-defiberized particles are rejected when the paperstock, still at substantially 1% consistency, passes on to the secondary or fine screen 58 having ⅛" hole diameter. These holes are fine enough to reject the not-fully-defiberized particles which may be taken off after spraying with white water from branch 59, at a dilution of about 4% and by way of the pump 61 carried back through the connection 45 into the mixing chamber 30 where they are picked up by the refining cycle to receive another chance at defiberization. A relatively pure, homogeneous paper stock of suitable fibre structure passes through the secondary screen 58 and is ready for dewatering on the deckers 65, 66, and 67 which it reaches by way of the connections 64, and 68, 69, and 70 respectively. White water from these deckers is re-used in the process at it passes through the valve 74, connection 73, pump 72 and connection 44, and the branches 50a, 55, and 59. Paper stock of about 3½% consistency leaves the deckers through connections 75, 76, and 77 to be collected in the stock chest 78 from which it may be pumped either directly to the board machine screens as trough connection 83, pump 81, valve 80, and connection 79, or else if the required paper quality or other considerations demand it, the stock is subjected to a further finishing step in a refiner 84 of the non-cutting type which may be similar to refiner 25 used in afore-mentioned initial refining step, in which case the valve 80 is shut and the valve 86 opened.

A modified form of this optional final refining step according to Figure 2 fairly duplicates the initially described combination of a refiner with a flow box in that it adds the flow box 90 functioning identically as the one 25 above, in that the refiner 84 is closed circuited with the mixing chamber 90c while the pump 91 feeds pulp from the stock chest 92 through connections 93 and 94 into the feed chamber 90a, permitting a portion of the feed to pass on into the mixing chamber 90c, while the balance returns or gravitates through the connection 95 from the surplus return chamber 90b back into the stock chest 92. Finished double refined stock leaves the flow box at 96 to go to production.

We claim:

1. The process of waste paper stock preparation which comprises treating mixed waste paper stock in a breaker beater; exposing the beaten stock mass to a refining step wherein there is effected a mechanical although non-cutting disintegration of the stock by way of attrition and shredding through suitably enforced contacts of the stock with suitable shred producing surfaces of attrition accompanied by rehydration, said disintegration forming the stock into a substantially defiberized portion including defiberized and rehydrated fibers and a substantially non-defiberizable portion such as trash; screening the refined stock to selectively classify it into rejects which fail to pass said screening and into accepted refined stock which does so pass; exposing the accepted stock to a second screening stage to selectively classify it into lumps of hard paper stock which has escaped defiberization and into an accepted stock substantially free from both trash and lumps; recirculating the lumps of hard stock back to a point in the system ahead of the refining step; and finally feeding said last mentioned accepted stock to a paper machine.

2. A waste paper stock treatment system, which comprises a disintegrating breaker beater for the raw stock, a refiner for the beaten stock mass and of the type in which there is effected a mechanical although non-cutting disintegration of the stock by way of attrition and shredding through suitably enforced contacts of the stock with suitable shred producing surfaces of attrition accompanied by rehydration, said refiner thus adapted to form the stock into a substantially defiberized portion including defiberized and rehydrated fibers and a substantially non-defiberizable portion such as trash a settling container adapted for the passage therethrough of stock treated by said refiner, a coarse or primary screening stage to treat overflow from said settling container and effective to reject junky constituents thereof while permitting passage of usable paper stock, a fine or secondary screening stage for treating the screen pulp from the said primary stage and effective to reject insufficiently defiberized stock, a connection for returning the rejects from said secondary screen to the said refiner and a flow box arrangement interposed between said breaker beater and said refiner which comprises an inlet for the disintegrated or beaten stock from the breaker beater, an outlet for a surplus of said stock an outlet connection to feed said stock to said refiner, an inlet connection for returning the refined stock from the refiner, an outlet connection for feeding refined stock to said settling container, an inlet for the rejects returned from said secondary screening stage and controllable flow splitting and checking means operable to effect a desired proportioning and correlation of the respective volumes of stock entering and leaving the flow box arrangement.

3. A waste paper stock treatment system according to claim 2, in which the flow box of the flow box arrangement comprises a mixing chamber having associated therewith said inlet for disintegrated or beaten stock, and said outlet connection to said refiner, and said inlet connection for returning the refined stock from the refiner, and also said outlet connection for feeding refined stock to said settling container, said mixing chamber adapted for hydraulically effecting therein the mixing of the beaten stock received from the breaker beater, with the refined stock returned from the refiner; and in which the flow box arrangement also comprises an adjustable feed splitting baffle arranged in the said mixing chamber, which said baffle is effective to deflect a desired portion of the incoming returned refined stock, to go to discharge from said flow box and into said settling container, while the balance of the said returning refined stock mixes in said mixing chamber with the said disintegrated or beaten stock which enters the mixing chamber, the deflected portion of the refined stock normally containing a percentage of not fully defiberized stock in the form of particles thus being deflected without having had sufficiently frequent recirculation through the refiner, said insufficiently defiberized portion forming a part of the rejects of the said secondary screen, which said rejects are being returned to the flow box for remixing with the stock to be refined.

ARNO W. NICKERSON.
EMIL C. GILDENZOPF.